United States Patent
Cahall et al.

(10) Patent No.: US 10,291,866 B2
(45) Date of Patent: May 14, 2019

(54) LENS ATTACHMENT FOR MULTI-CAMERA DEVICE

(71) Applicants: Scott C. Cahall, Fairport, NY (US); Mark E. Bridges, Spencerport, NY (US); Julie K. Gerstenberger, Rochester, NY (US)

(72) Inventors: Scott C. Cahall, Fairport, NY (US); Mark E. Bridges, Spencerport, NY (US); Julie K. Gerstenberger, Rochester, NY (US)

(73) Assignee: Moondog Optics, Inc., Fairport, NY (US)

( * ) Notice: Subject to any disclaimer, the term of this patent is extended or adjusted under 35 U.S.C. 154(b) by 0 days.

(21) Appl. No.: 15/613,373

(22) Filed: Jun. 5, 2017

(65) Prior Publication Data

US 2017/0374253 A1    Dec. 28, 2017

Related U.S. Application Data

(60) Provisional application No. 62/354,144, filed on Jun. 24, 2016.

(51) Int. Cl.
| | |
|---|---|
| H04N 5/341 | (2011.01) |
| H04N 5/232 | (2006.01) |
| H04N 5/225 | (2006.01) |
| G03B 17/56 | (2006.01) |
| H04M 1/02 | (2006.01) |
| H04N 5/247 | (2006.01) |

(52) U.S. Cl.
CPC ......... *H04N 5/3415* (2013.01); *G03B 17/565* (2013.01); *H04N 5/2252* (2013.01); *H04N 5/2254* (2013.01); *H04N 5/23296* (2013.01); *H04N 5/247* (2013.01); *H04M 1/027* (2013.01); *H04M 1/0264* (2013.01)

(58) Field of Classification Search
None
See application file for complete search history.

(56) References Cited

U.S. PATENT DOCUMENTS

| | | | |
|---|---|---|---|
| 7,561,191 B2 | 7/2009 | May | |
| 8,279,544 B1 | 10/2012 | O'Neill | |
| 2012/0162366 A1* | 6/2012 | Ninan | H04N 5/2355 348/43 |
| 2013/0229529 A1* | 9/2013 | Lablans | H04N 5/23238 348/169 |
| 2015/0109524 A1* | 4/2015 | Laroia | G02B 13/02 348/369 |

* cited by examiner

*Primary Examiner* — Mark T Monk
(74) *Attorney, Agent, or Firm* — Louis S. Horvath

(57) ABSTRACT

A removable optical attachment has an angular field-of-view-changing optic that simultaneously extends over an objective lens for a first camera and an objective lens for a second camera.

12 Claims, 14 Drawing Sheets

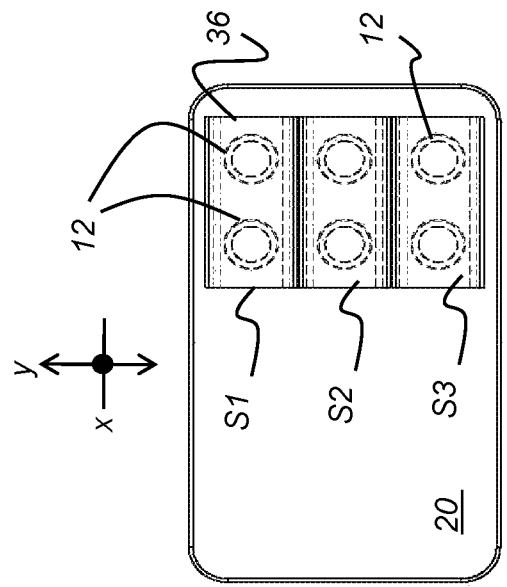
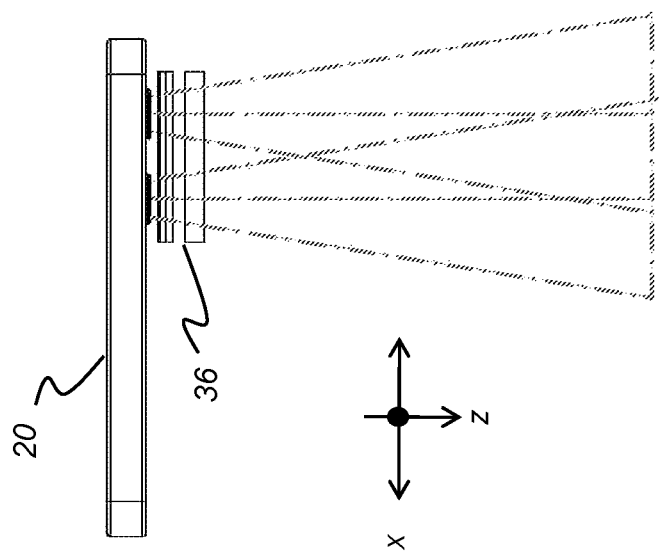
FIG. 2B
FIG. 2A

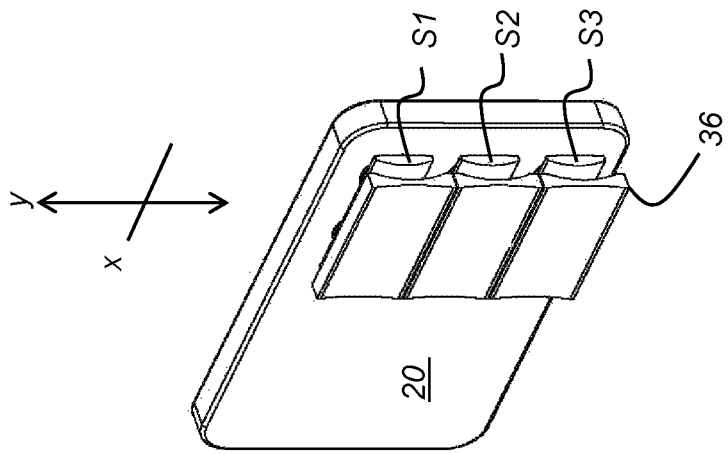
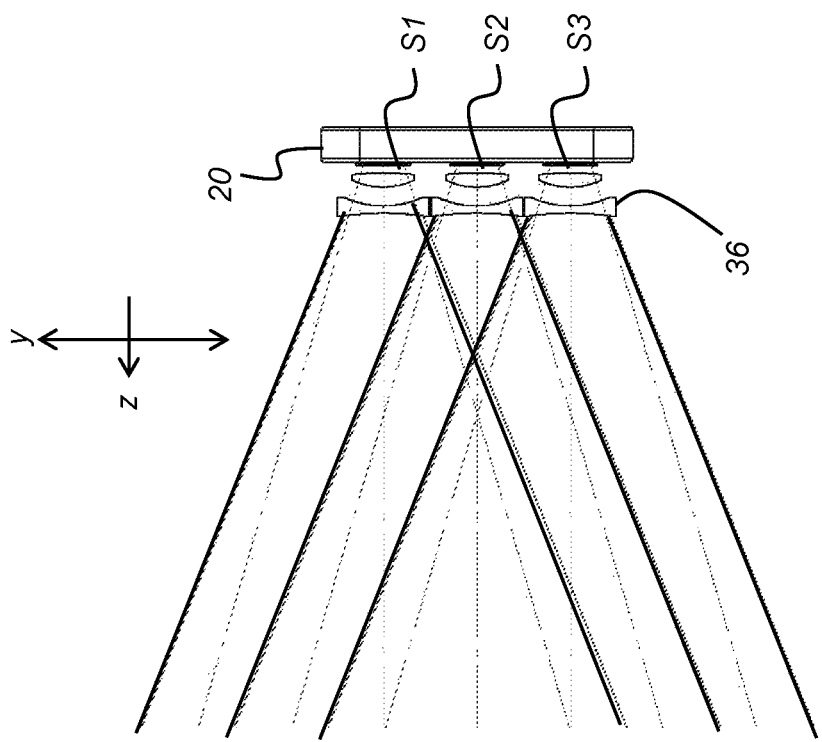

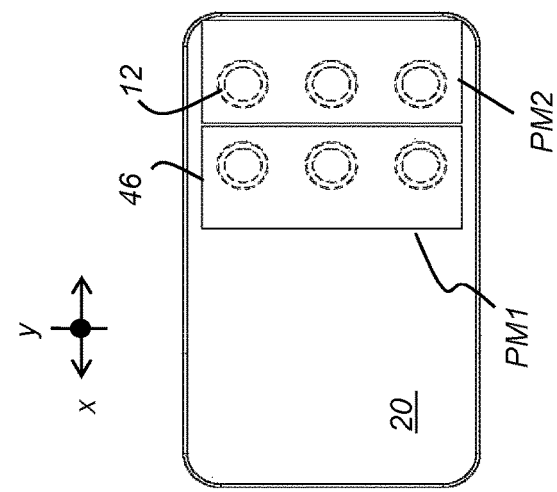
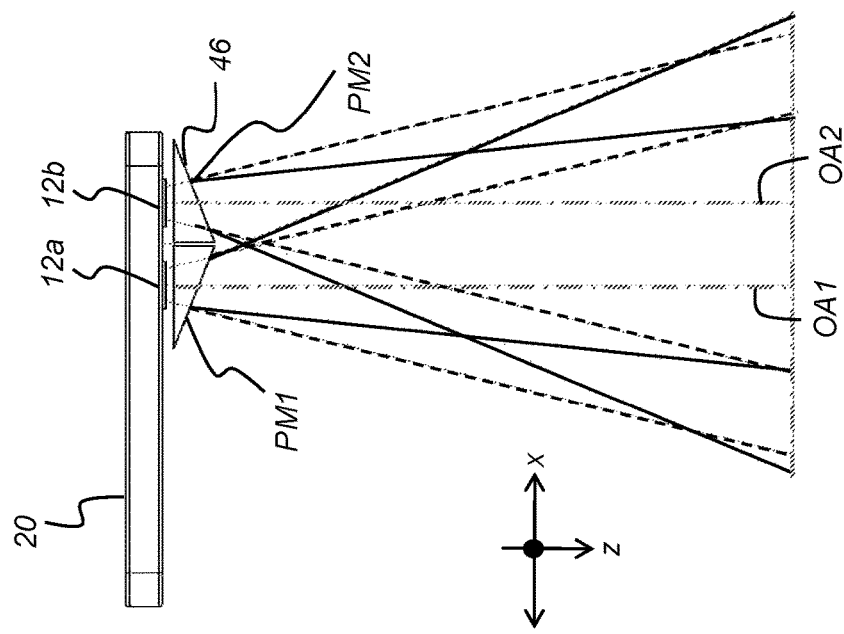
FIG. 3B
FIG. 3A

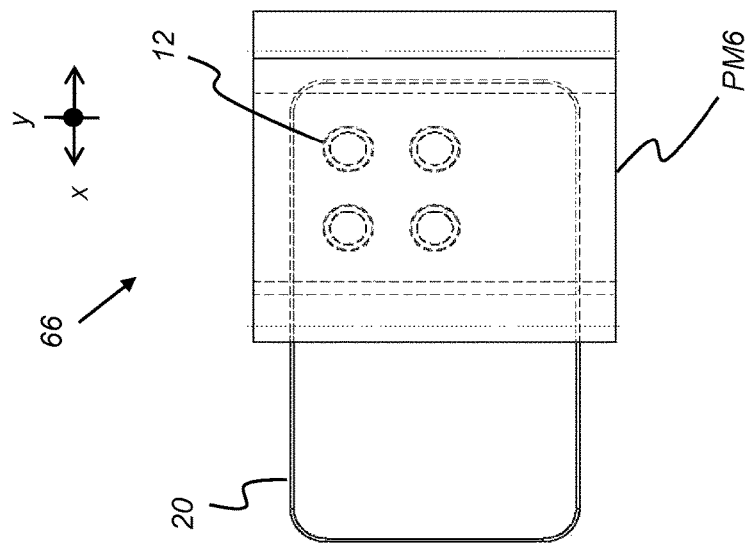
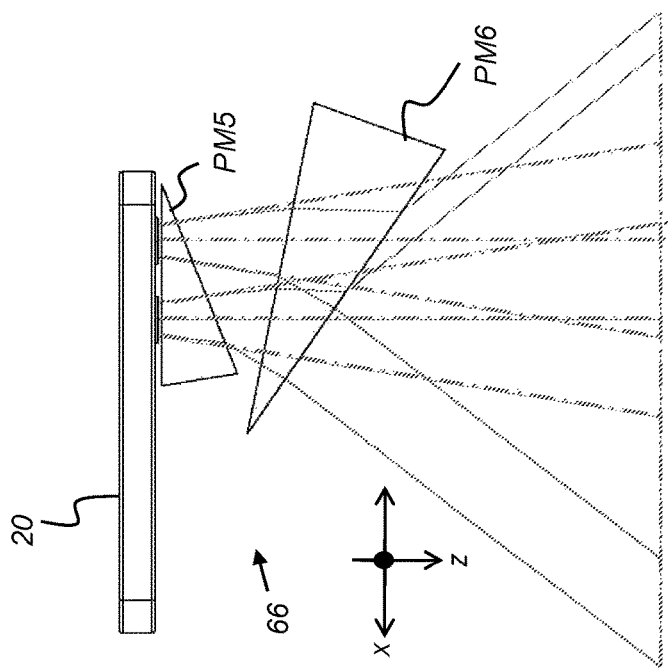
FIG. 5B
FIG. 5A

LENS ATTACHMENT FOR MULTI-CAMERA DEVICE

CROSS REFERENCE TO RELATED APPLICATIONS

The present application claims the benefit of U.S. Provisional application Ser. No. 62/354,144, provisionally filed on Jun. 24, 2016 entitled "LENS ATTACHMENT FOR MULTI-CAMERA DEVICE" in the names of Scott C. Cahall and Mark E. Bridges.

FIELD OF THE INVENTION

The present disclosure relates generally to camera optics and more particularly to a lens attachment for hand-held personal communications devices having multiple cameras.

BACKGROUND OF THE INVENTION

Advances in optical and electronic technologies have spawned the development of hand-held, mobile personal communications devices such as smartphones that have small, integrated cameras that afford their users considerable image acquisition and distribution capabilities. As the base of users of these devices expands, user interest in advanced imaging capabilities has grown correspondingly. To enhance the set of imaging tools available to their users, manufacturers of personal communications devices are offering multiple cameras in a single device, with benefits such as increased field of view, capability to obtain images from both sides of the device, support of advanced capabilities such as 3D imaging and gesture sensing, and overall improved image quality.

A number of lens attachments have been introduced to meet the need for improved imaging and expanded capability. However, existing lens attachment solutions are often characterized as relatively bulky and unwieldy, complex in construction, and intended only for use with a single camera. Thus, there is interest in easily removable lens attachments that can be used for devices having multiple cameras on one side of the device, including devices that have cameras that differ in performance such as focal length, field of view, sensor size/type, numerical aperture, and spectral sensitivity range.

SUMMARY OF THE INVENTION

An object of the present disclosure is to advance the art of camera optics for personal hand-held mobile communications devices. Embodiments of the present disclosure address the need for a lens attachment that is suited to the task of altering the field of view where multiple cameras are provided along one surface of a personal communications device.

According to one aspect of the invention, there is provided a removable optical attachment comprising an angular field-of-view-changing optic that simultaneously extends over an objective lens for a first camera and an objective lens for a second camera.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 2A is a top view of a removable optical attachment coupled to a personal communications device according to an alternate embodiment.

FIG. 2B is a plan view that shows a personal communications device having an array of cameras and a removable optical attachment with corresponding lenses.

FIG. 2C is a side view that shows a personal communications device having an array of cameras and a removable optical attachment with corresponding lenses.

FIG. 2D is a perspective view showing the removable optical attachment coupled to a personal communications device.

FIG. 3A is a top view of a prism attachment coupled to a personal communications device according to an alternate embodiment.

FIG. 3B is a plan view that shows a personal communications device having an array of cameras and a removable optical attachment with corresponding prisms.

FIG. 5A is a top view of a removable optical attachment using two prisms, coupled to a personal communications device according to an alternate embodiment.

FIG. 5B is a plan view that shows a personal communications device having an array of cameras and a removable optical attachment with corresponding prisms.

DETAILED DESCRIPTION OF THE INVENTION

Figure 1B:
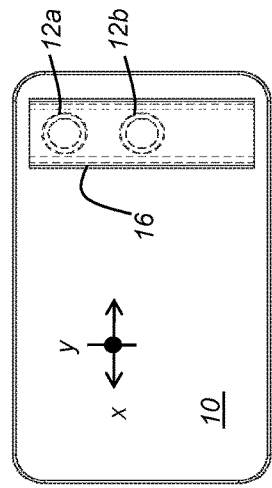
FIG. 1B shows a removable anamorphic optical attachment that is removably coupled to a personal communications device.

The following is a detailed description of the preferred embodiments of the invention, reference being made to the drawings in which the same reference numerals identify the same elements of structure in each of the several figures.

Where they are used, the terms "first", "second", and so on, do not necessarily denote any ordinal, sequential, or priority relation, but are simply used to more clearly distinguish one element or set of elements from another, unless specified otherwise. In the context of the present disclosure, the terms "viewer", "operator", and "user" are considered to be equivalent and refer to the person who views content and enters commands on a computer or handheld device display.

In the context of the present disclosure, the general term "personal communications device" is broadly used to encompass laptop or personal computers as well as any of a number of types of wireless mobile or portable personal communications devices that may be carried by a user. Hand-held devices of this type can include personal communications devices such as cellular phones, so-called "smartphones" that provide some type of mobile operating system, feature phones having at least some measure of computing capability, and various types of wireless, networked electronic pads, computerized tablets, and similar devices that can include multiple cameras distributed along one surface of the device. Examples of types of personal communications devices that can be particularly useful for embodiments of the present invention include smartphones such as the Android™ smartphone platform (Android is a trademark of Google, Inc.), the iPhone (from Apple Inc.), tablet computers in general, smart watches, and devices with similar capability for acquiring digital images from cameras mounted along one surface of the device.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components. Coupling can use various mechanisms, including one or more clips, suction cups, magnets, mechanical fittings, adherence by electrostatic forces, hook and loop or fiber linkages such as Velcro™, a product of Velcro Companies, or other removable fasteners.

In the context of the present disclosure, the terms "optic" and "optics" are used generally to refer to lenses and other refractive, diffractive, and reflective components or apertures used for shaping and repositioning light.

In the context of the present disclosure, the objective lens of a camera, also known as the prime lens, is the primary image-forming lens that creates an image of an object on an image-sensing surface.

The present disclosure distinguishes optics that change the angular field of view (FOV) of a camera or other optical system from other types of optics. With respect to objective optics for cameras and other image sensors, the field of view is defined in terms of both angular extent of the light gathered by the objective lens and the direction or orientation of the optical axis for the objective lens. Optics that are considered to be angular field-of-view-changing optics include lenses that have optical power in one or both dimensions and prisms that are thus disposed to redirect, expand, or compress the FOV. Domes (having two curved surfaces but zero optical power) and windows (with two parallel plano surfaces) are not considered angular field-of-view-changing optics.

In the context of the present disclosure, first and second camera FOVs are considered to overlap if at least a portion of the first camera FOV lies within the second camera FOV.

Personal communications devices typically incorporate cameras. For the most part, these devices provide a single camera, located on any given side of a device. For such single-camera devices, it is relatively straightforward to design an adapter lens or lens attachment that attaches in front of the camera, wherein this adapter lens can alter (expand or compress) the field of view (FOV) of the camera. In the camera industry, these lenses or lens attachments are known as wide angle adapters and telephoto adapters, respectively.

With multiple cameras having overlapping FOVs and having objective lenses on the same side of a personal communications device, the use of adapter lenses and removable optical attachments with lenses or other optics becomes increasingly more complicated. In the simplest case, where there are multiple cameras on a given side of a device and the objective lenses of the cameras are well-separated from each other, each camera could be provided with an individual adapter for FOV modification. With more compact devices such as smartphones, however, an arrangement with multiple adapter lenses can be impractical, with the likelihood that adjacent attachments interfere with each other, optically or mechanically.

Alternatives to individual lenses or lens attachments can include use of a single adapter lens for multiple cameras. Unfortunately, however, cameras need to be separated by at least some distance. The spacing of cameras from each other is at least dependent on the size of their respective sensors. Attempting to provide a single working optical solution for FOV adjustment of any number of cameras would result in an impractically "fast" (i.e., low f/#) and complex lens.

An embodiment of the present disclosure addresses the need for FOV adjustment of personal communications device optics by providing a removable optical attachment that has an angular field-of-view-changing optic that simultaneously extends over an objective lens for a first camera and an objective lens for a second camera, positioned in the optical path of each of at least the first and second cameras. The removable optical attachment can have optical power for FOV adjustment only in one dimension, or can adjust the angular extent of the FOV or shift the pointing of the FOV, or has both optical power and pointing functions. The FOV adjustment that is provided by an optic can be in a dimension orthogonal to a line that connects the center points of the objective lenses of the two or more cameras. Alternately considered, the FOV adjustment that is provided can be in a dimension orthogonal to the plane that is defined by the optical axes of two or more cameras adjacent in a row or column of cameras. The FOV adjustment that is provided can be in the short dimension of an area that encompasses the apertures of all of the cameras being considered for a given adapter lens. The effective aperture in this dimension is substantially equivalent to that of a single camera, for an optic that alters the FOV in that dimension only. The removable optical attachment of the present disclosure can provide optical power (or more generally, alters the FOV) in one dimension, covering multiple cameras at a time.

Anamorphic lens attachments (also known as anamorphic adapter lenses) are optical attachments that expand or compress the field of view (FOV) of a prime lens in one dimension, typically for expanding the horizontal FOV. Particularly desirable where lenses are used for cinematography, the anamorphic adapter lens allows the camera to capture an image having a wider aspect ratio than would be possible with a conventional (non-anamorphic) prime lens with a given sensor.

Figure 1C:
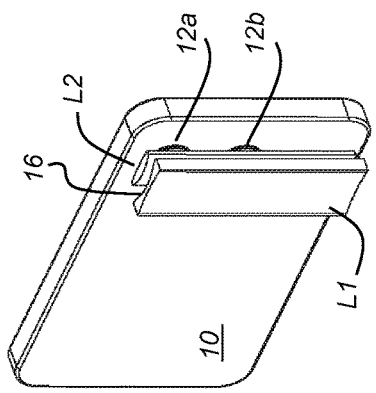
FIG. 1C is a perspective view showing a removable optical attachment coupled to a personal communications device.
Figure 1A:
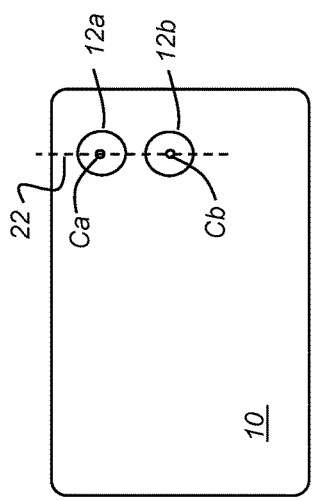
FIG. 1A is a plan view showing a personal communications device having a pair of cameras with integral lenses, both located along the same surface.

FIG. 1A is a plan view showing a personal communications device 10, such as a smartphone, having a pair of cameras with integral objective lenses 12a and 12b, both located along the same surface. Center point Ca is indicated on the camera objective lens 12a. Center point Cb is indicated on the camera objective lens 12b. The respective optical axes for the two cameras extend outward with respect to these center points. An embodiment of the present disclosure provides an anamorphic lens attachment that has optical power in a dimension that is substantially orthogonal to a line 22 between center points Ca and Cb. By substantially orthogonal is meant orthogonal to within a range that is less than +/−25%, more suitably less than about +/−12%.

FIG. 1B shows an anamorphic optical attachment 16 that clips onto or is otherwise removably coupled to device 10, extending over both lenses 12a and 12b.

FIG. 1C is a perspective view showing personal communications device 10 with optical attachment 16. Optical attachment 16 can have multiple lenses L1, L2 as shown in FIG. 1C. Lenses L1 and L2 are both cylindrical lenses in the example shown.

Figure 1E:
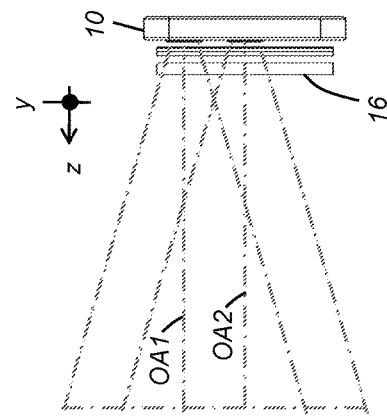
FIG. 1E is a side view of the device of FIGS. 1B-1D.
Figure 1D:
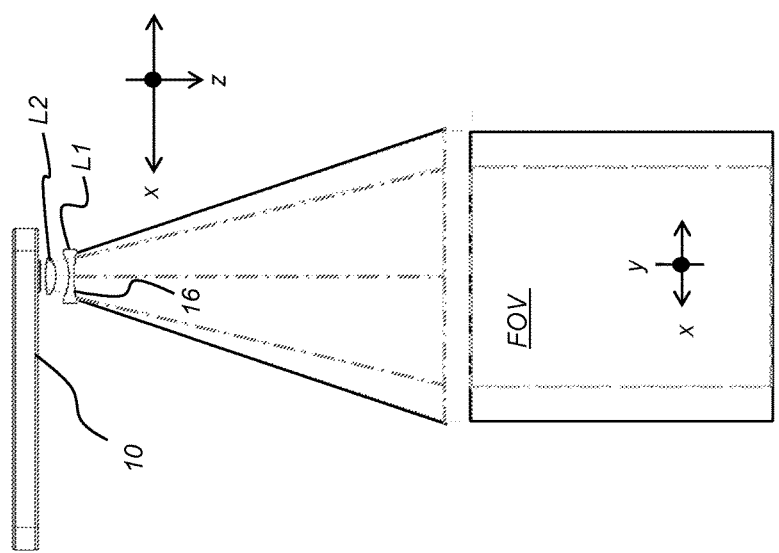
FIG. 1D is a top view that shows field of view (FOV) expansion for the removable optical attachment of FIGS. 1B and 1C.

FIG. 1D shows, from a top view, how the anamorphic optical attachment 16 expands the FOV of both cameras simultaneously, only along the x-axis dimension, orthogonal to line 22 shown in FIG. 1A. FOV expansion is only relative to the x-axis, horizontal in the embodiment of FIGS. 1B, 1C, and 1D. The FOV shown in FIG. 1D is a plan view, rotated to show expansion along the x-axis only and pictured as if looking out from the camera viewfinder. In FIG. 1D and subsequent figures, solid lines indicate the expanded FOV; dashed lines indicate the original FOV of the camera of device 10 without attachment 16.

FIG. 1E is a side view of device 10 with optical attachment 16 and showing the relative FOV of each camera in the y dimension. As shown, the FOV with respect to the y axis is unchanged. Optical attachment 16 in this embodiment spans two lenses, lying simultaneously in the path of optical axis OA1 for camera lens 12a and in the path of optical axis OA2 for camera lens 12b.

Figure 1G:
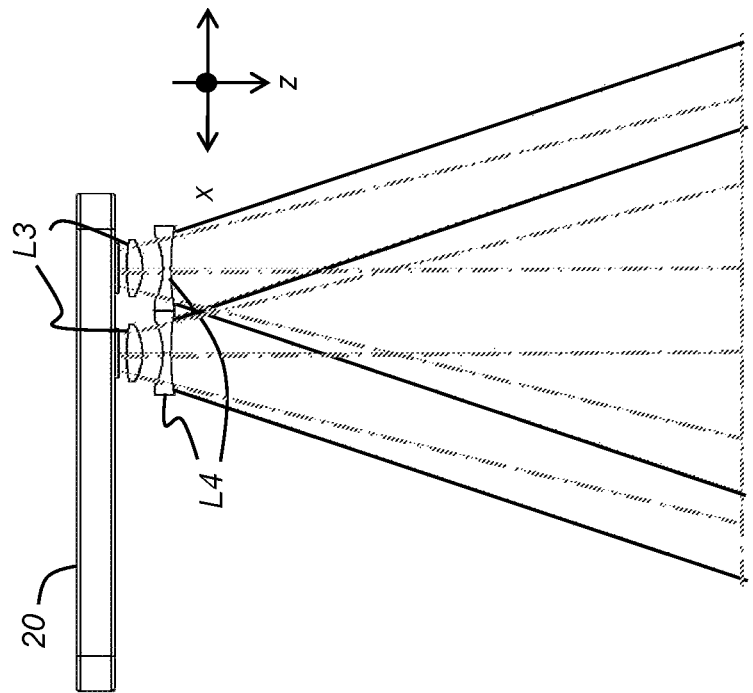
FIG. 1G is a top view of the device and lens attachment according to an alternate embodiment.
Figure 1F:
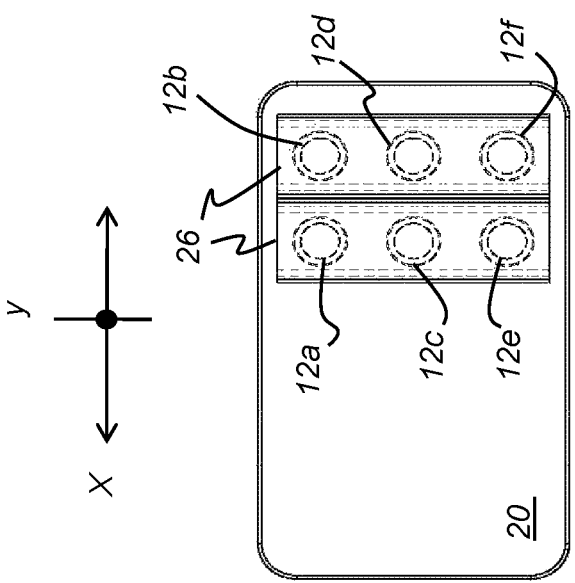
FIG. 1F is a plan view that shows a personal communications device having an array of cameras, with corresponding removable optical attachments.

FIG. 1F is a plan view that shows a personal communications device 20 having an array of six cameras positioned along a single surface of the device, with corresponding objective lenses 12a, 12b, 12c, 12d, 12e, and 12f. One or more anamorphic optical attachments 26 are coupled to device 20. Each optical attachment 26 spans three lenses, providing FOV expansion along the horizontal x axis. As shown in the top view of FIG. 1G, lenses L3 and L4 are provided within each optical attachment 26.

Figure 1I:
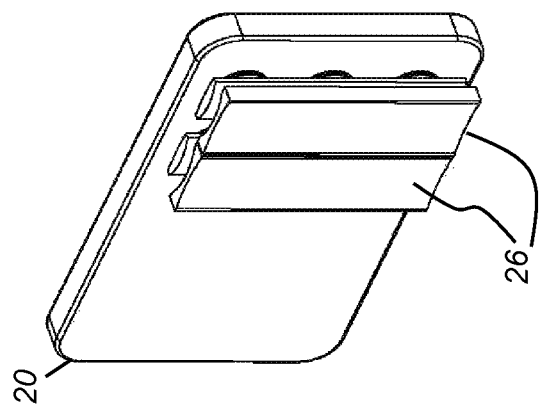
FIG. 1I is a perspective view showing the removable optical attachment coupled to a device.
Figure 1H:
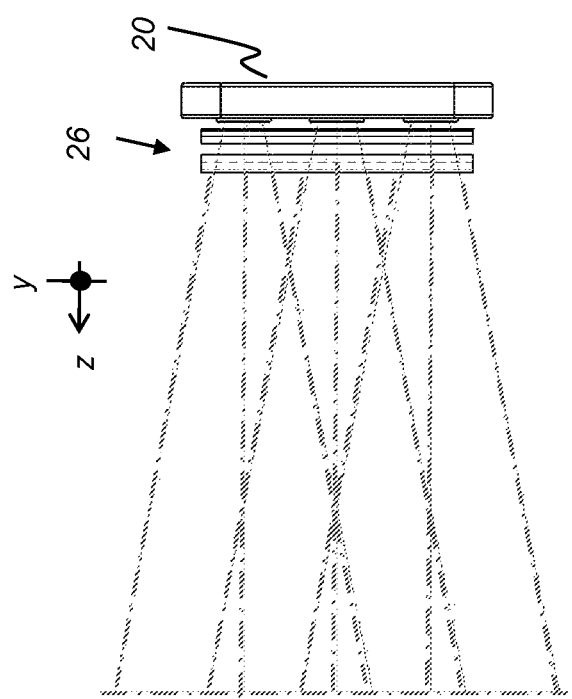
FIG. 1H is a side view of the device of FIGS. 1F-1G.

FIG. 1H shows a side view, indicating that there is no optical power provided by attachment 26 in the vertical (y axis) dimension. FIG. 1I shows a perspective view of device 20 with two removable optical attachments 26, placed side by side and independently removable.

FIGS. 2A, 2B, 2C, and 2D show an alternate arrangement for a personal communications device 20 having multiple cameras. An anamorphic removable optical attachment 36 is shown, with three cylindrical lens sections S1, S2, and S3, each section spanning two camera lenses 12. In the embodiment shown in FIGS. 2A-2D, there is no change to optical power in the x dimension shown; optical power is only provided in the y axis dimension. It should be noted that the lens sections S1, S2, and S3 shown can be separable or joined to form a single unit as lens attachment 36.

Figure 3D:
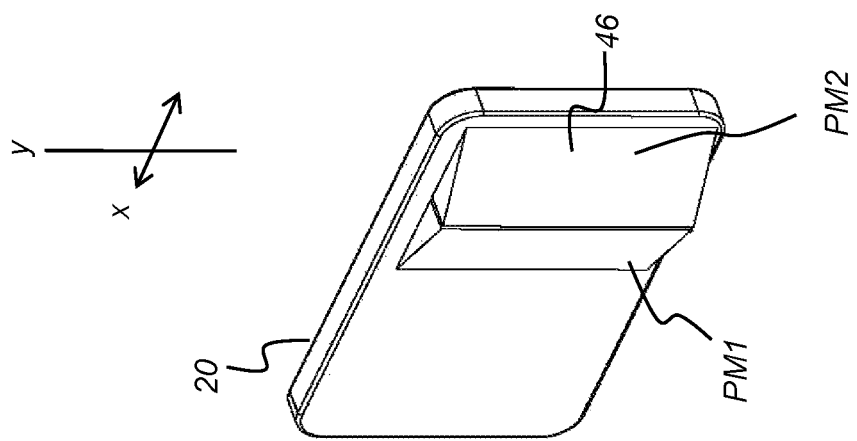
FIG. 3D is a perspective view showing the prism attachment coupled to a personal communications device.
Figure 3C:
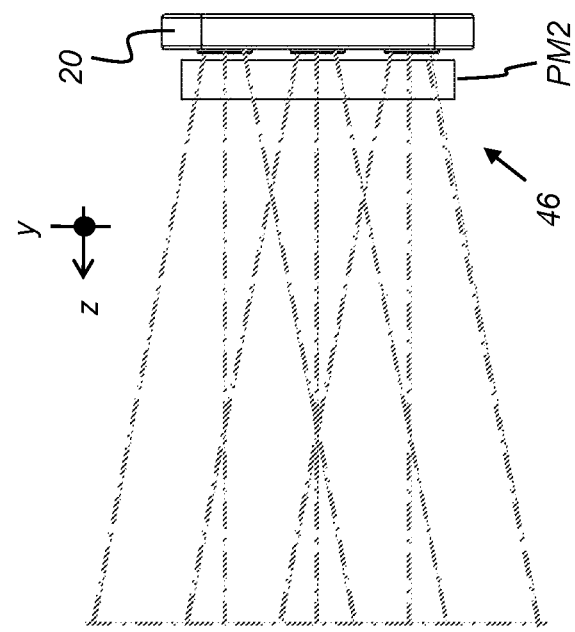
FIG. 3C is a side view that shows a personal communications device having an array of cameras and a prism attachment with corresponding lenses.
Figure 4B:
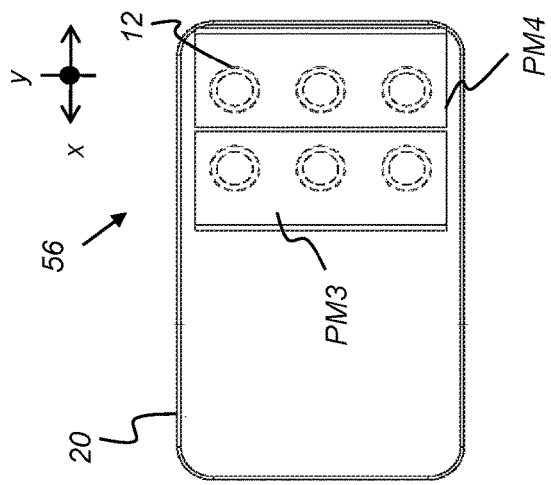
FIG. 4B is a plan view that shows a personal communications device having an array of cameras and a removable optical attachment with corresponding prisms and showing the relative positions of camera objective lenses.
Figure 4A:
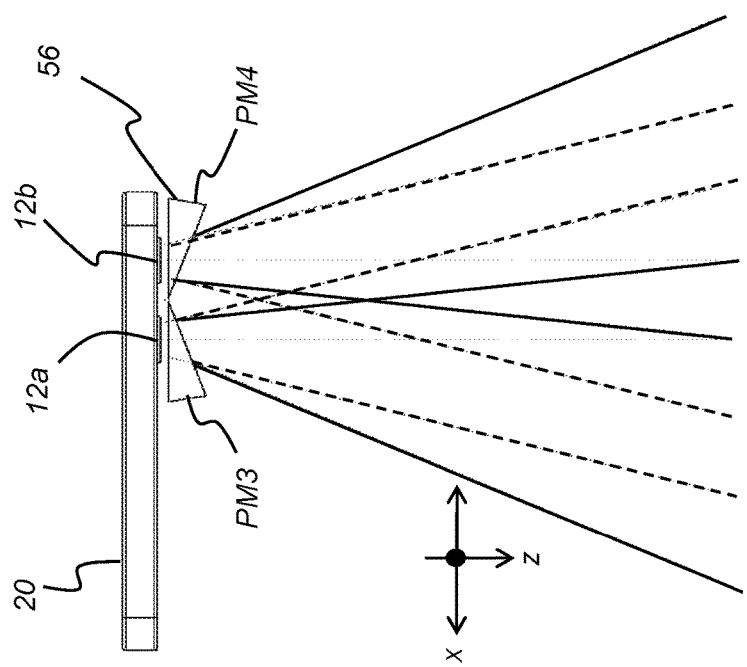
FIG. 4A is a top view of a removable optical attachment with prisms, coupled to a personal communications device according to an alternate embodiment.
Figure 4D:
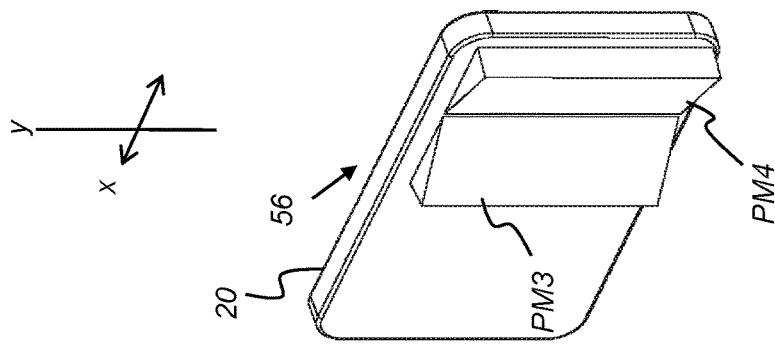
FIG. 4D is a perspective view showing the removable optical attachment of FIG. 4C coupled to a personal communications device.
Figure 4C:
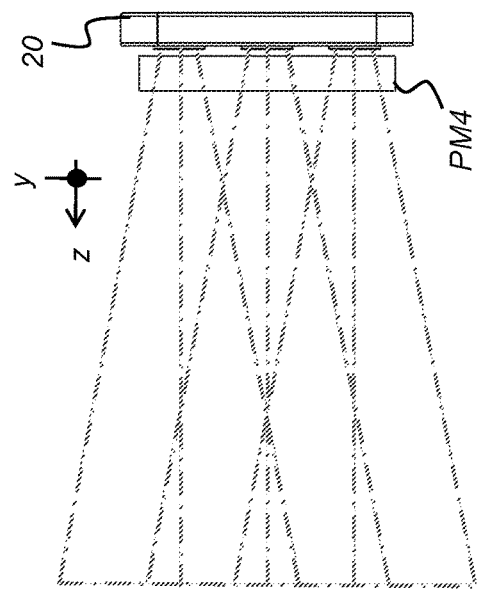
FIG. 4C is a side view that shows a personal communications device having an array of cameras and a removable optical attachment with corresponding prisms.
Figure 5D:
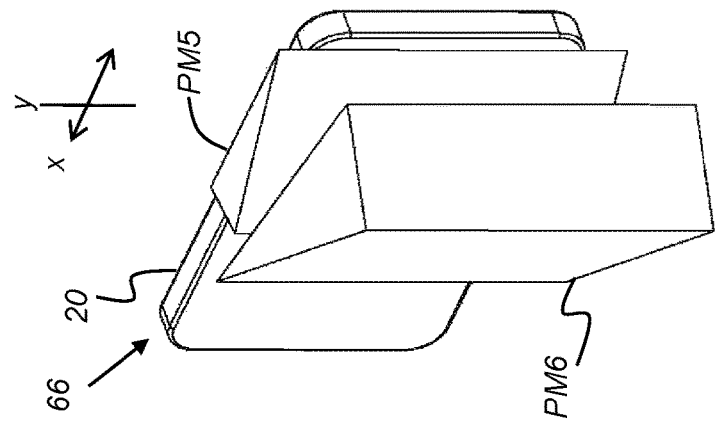
FIG. 5D is a perspective view showing the prism attachment coupled to a personal communications device.
Figure 5C:
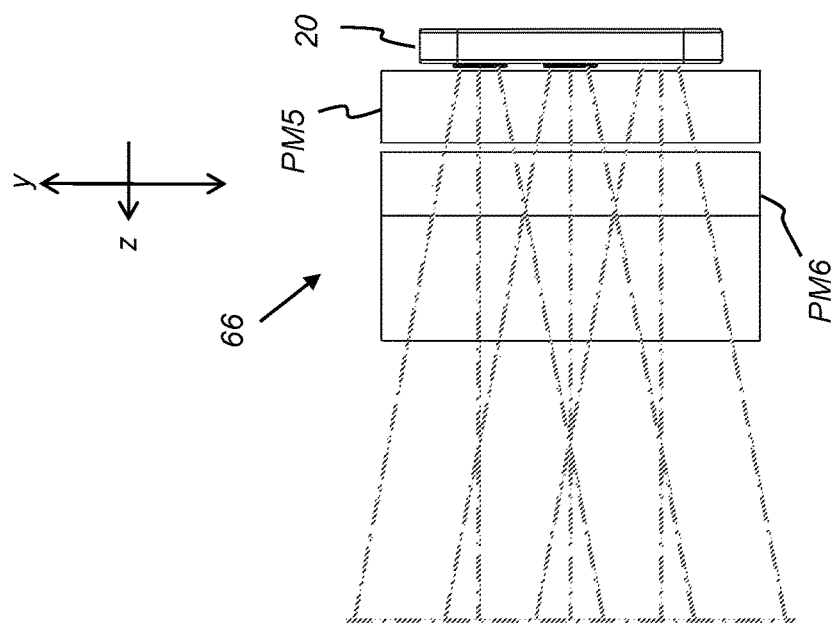
FIG. 5C is a side view that shows a personal communications device having an array of cameras and a removable optical attachment with corresponding prisms.

FIGS. 3A, 3B, 3C, and 3D show an alternate arrangement for a personal communications device 20 having multiple cameras and using prism optics rather than lenses. An FOV redirecting prism attachment 46 is shown, with two prisms PM1 and PM2, each prism spanning across three camera lenses 12 and redirecting their corresponding optical paths with respect to one dimension. In the embodiment shown in FIGS. 3A-3D, there is no change to optical power in the y dimension shown, as particularly shown in FIG. 3C. Angular redirection of the FOV is provided only in the x axis dimension. The original direction of the camera optical axes OA1 and OA2 with respect to the x axis is indicated in FIG. 3A.

In the embodiment best shown in the top view of FIG. 3A, prism PM1 shifts or redirects the FOV from its original angular orientation (i.e., its pointing) for camera 12a, shown in dashed lines, to an alternate direction shown by solid lines.

This redirection is along or with respect to the x axis, effectively redirecting the FOV of camera 12a to cross over the FOV of the paired camera lens 12b. Correspondingly, prism PM2 shifts the FOV for camera 12b in the opposing dimension along the x axis. In this way, prism attachment 46 changes the amount of overlap of fields of view for adjacent camera lenses. With this attachment, the cameras may generally share less overlap area, but have a wider combined overall FOV.

FIGS. 4A, 4B, 4C, and 4D show an alternate arrangement for a personal communications device 20 having multiple cameras. A redirecting prism attachment 56 is shown, with two prisms PM3 and PM4, each prism spanning three camera lenses 12. In the embodiment shown in FIGS. 4A-4D, there is no optical power provided in the y dimension, as particularly shown in FIG. 4C. Shifting or redirection of the FOV is provided only in the x axis dimension.

Unlike the arrangement of redirecting prism attachment 46 in FIGS. 3A-3D, redirecting prism attachment 56 of FIGS. 4A-4D redirects the FOVs of adjacent cameras 12a, 12b away from each other with respect to the x axis. Dashed lines indicate the original FOV for camera 12a; solid lines indicate the redirection of the FOV to the left from this original position caused by prism PM3. Prism PM4 causes a corresponding movement to the right for the camera 12b FOV. With this attachment, the cameras generally have less overlap area, but a wider combined overall FOV. As shown in the examples of FIGS. 3A-3D and 4A-4D, prisms can be used as part of an optical attachment to effectively redirect the optical axes of cameras 12 toward or away from each other.

FIGS. 5A, 5B, 5C, and 5D show an alternate arrangement for a personal communications device 20 having multiple cameras. An anamorphic prism attachment 66 is shown, with two or more prisms PM5 and PM6, each prism spanning multiple camera lenses 12, including arrangements with camera lenses 12 in multiple rows and columns. Coupling and connecting hardware for mounting the prisms to the device 20 are not shown in this schematic representation. In the embodiment shown in FIGS. 5A-5D, prisms PM5 and PM6 span all four camera lenses 12. This configuration could also apply to cases wherein the prisms span just a single row or column of cameras. There is no change to optical power provided in the y-axis dimension shown; optical power is only provided in the x-axis dimension.

Figure 6A:
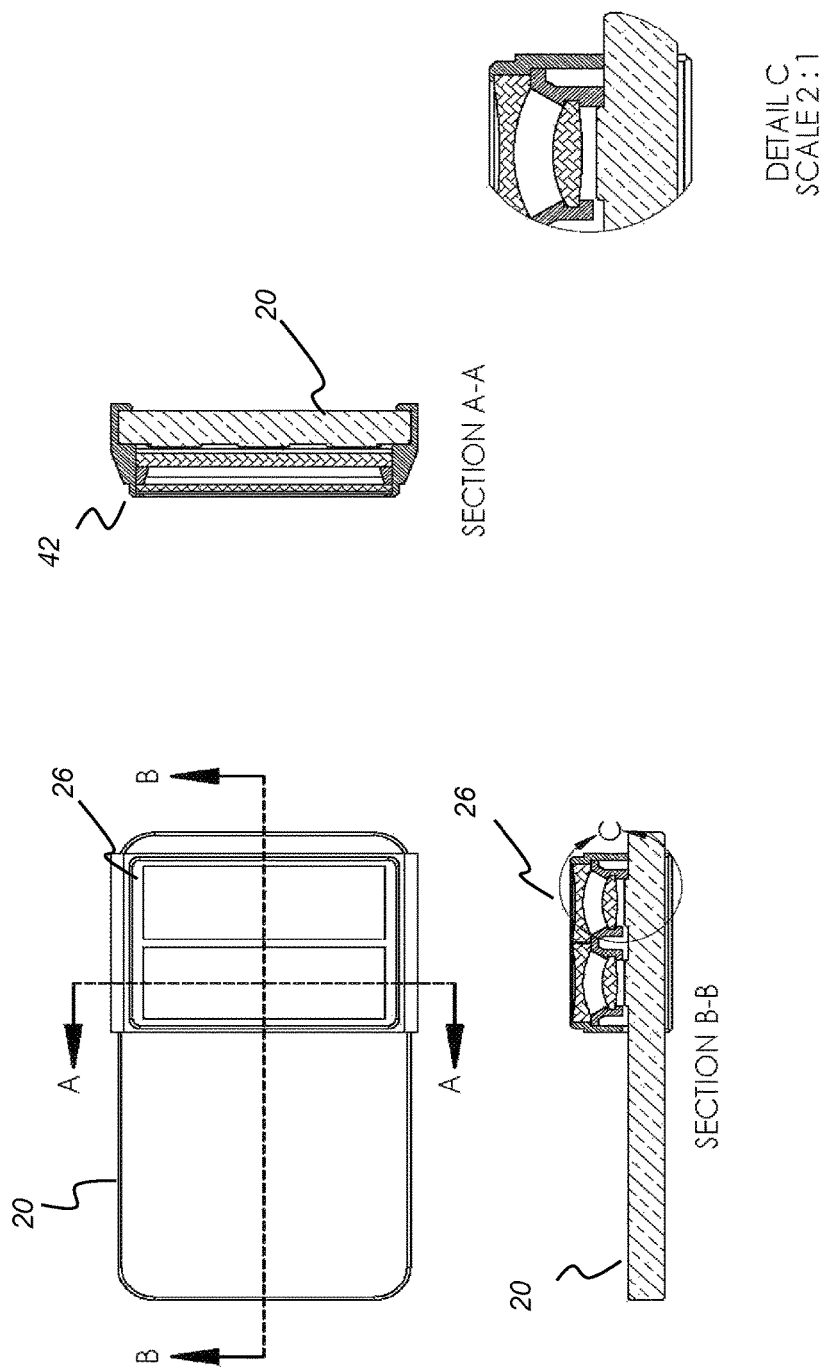
FIG. 6A shows mechanical details of a removable optical attachment coupled to device by a bracket.
Figure 6C:
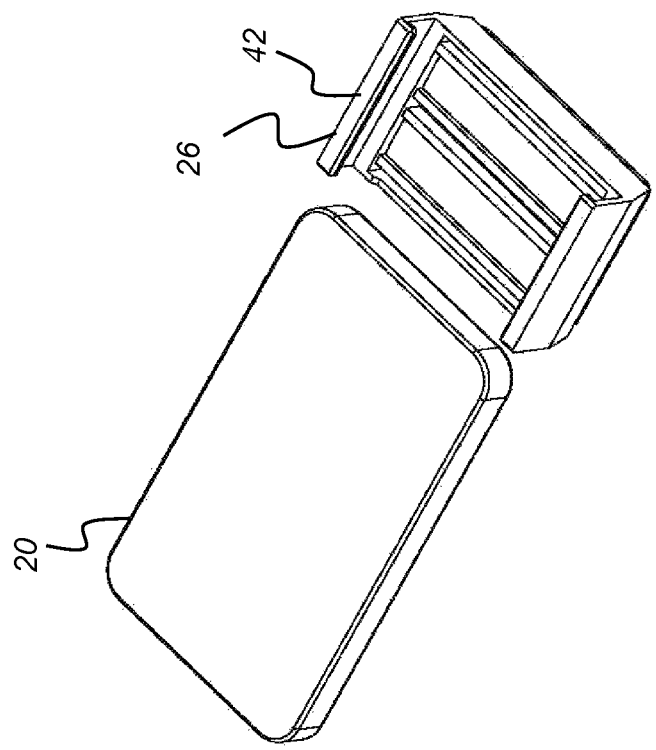
FIGS. 6B and 6C show perspective front and rear views of the anamorphic removable optical attachment separated from the personal communications device.
Figure 6B:
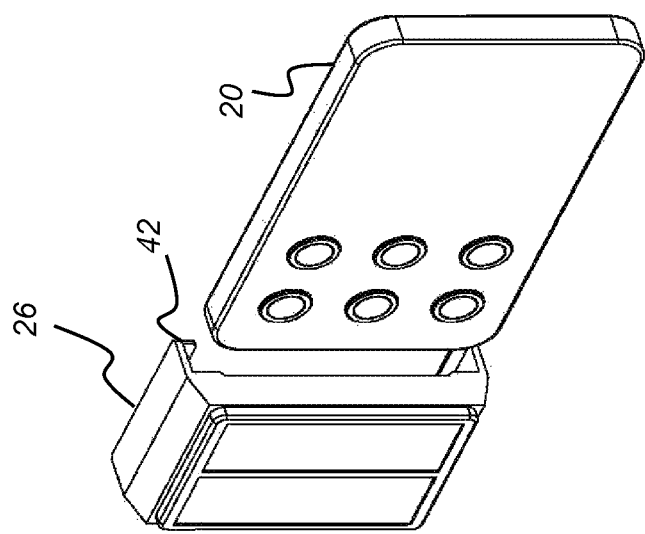

FIG. 6A shows mechanical details of an optical attachment 26, coupled to device 20 by a bracket 42. FIGS. 6B and 6C show perspective front and rear views of the attachment 26 separated from device 20.

Embodiments of the present disclosure redistribute light from the FOV of multiple cameras at a time using a suitable optic, such as using a cylindrical lens (or lens system) as in the examples of FIGS. 1B-2D or using a prism (or prism system) as shown in the examples of FIGS. 3A-5D.

Lens elements can be formed inexpensively using various types of optical glass or plastic. High-index optical plastics can be used, for example.

Described herein is a removable optical attachment having an optic that extends over multiple camera lenses on a single surface. The surface can be a side of a personal communications device. The optic can comprise a lens having optical power in only a single dimension. The optic can be a first prism or a system of prisms. The optic can be a first lens and further including a second lens that extends over additional multiple camera lenses on the personal communications device. The attachment can include a second prism that redirects light from the field of view to the first prism.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical attachment that comprises:
a coupling configured for removably coupling at least a first angular field-of-view-changing optic along a device surface,
wherein the device surface mounts a first objective lens for a first camera, wherein the first objective lens defines a first angular field of view for the first camera with a first angular extent for incident light along a first optical axis, and wherein the device surface further mounts a second objective lens for a second camera, wherein the second objective lens defines a second angular field of view for the second camera with a second angular extent for incident light along a second optical axis,
wherein the coupling disposes an optical surface of the at least the first angular field-of-view-changing optic to fully extend across both a first lens surface of the first objective lens and a second lens surface of the second objective lens on the device surface;
and wherein the at least the first angular field-of-view-changing optic is configured to change at least one of the corresponding angular extent or optical axis direction for each of the first and second cameras.

2. The optical attachment of claim 1 wherein the first lens surface has a first center point and the second lens surface has a second center point and wherein the at least the first angular field-of-view-changing optic is configured to change the angular extent or optical axis direction in a dimension that is orthogonal to a line connecting the first and second center points.

3. The optical attachment of claim 1 wherein the at least the first angular field-of-view-changing optic is configured to change the angular extent or optical axis direction in a dimension that is orthogonal to a shortest line connecting the first and second optical axes.

4. The optical attachment of claim 1 wherein the coupled optic is a lens having optical power in only a single dimension.

5. The optical attachment of claim 1 wherein the optical surface of the coupled optic further extends across a third surface of a third objective lens on the device surface.

6. The optical attachment of claim 1 wherein the optical surface of the coupled optic has curvature.

7. The optical attachment of claim 1 wherein the coupled optic has optical power in a first dimension that is orthogonal to a plane that is defined by the first and second optical axes and no optical power in a second dimension that is within the plane.

8. The optical attachment of claim 6 wherein the coupled optic has first and second surfaces with curvature.

9. the optical attachment of claim 1 wherein the coupling further couples a second optic to the device surface.

10. A removable optical attachment comprising an angular field-of-view-changing lens configured for coupling to a device, wherein the lens has a curved optical surface configured to simultaneously extend fully across both a first objective lens of a first camera of the device having a first optical axis and a first angular extent and a second objective lens of a second camera of the device having a second optical axis and having a second angular extent,
wherein the angular field-of-view changing lens is configured to form a first optical path that changes the first angular extent of the first camera and to form a second optical path, separated from the first optical path, that changes the second angular extent of the second camera.

11. The optical attachment of claim 10 wherein the angular field-of-view-changing lens is configured to change the angular extent or optical axis direction of the first and second objective lenses in a dimension that is orthogonal to a shortest line connecting the first and second optical axes.

12. The optical attachment of claim 10 wherein the coupled lens has optical power in a first dimension that is orthogonal to a plane that is defined by the first and second optical axes and no optical power in a second dimension that is within the plane.

* * * * *